(12) United States Patent
Felip et al.

(10) Patent No.: US 10,666,831 B2
(45) Date of Patent: May 26, 2020

(54) SUBSTRATE PERMEABILITY ASSESSMENT BASED ON AN IMAGE

(71) Applicant: HEWLETT-PACKARD DEVELOPMENT COMPANY, L.P., Houston, TX (US)

(72) Inventors: Carlos Felip, Barcelona (ES); Xavier Domingo Reguant, Sant Cugat del Valles (ES); Oriol Moliner Rafa, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 466 days.

(21) Appl. No.: 15/304,625

(22) PCT Filed: Apr. 25, 2014

(86) PCT No.: PCT/US2014/035505
§ 371 (c)(1),
(2) Date: Oct. 17, 2016

(87) PCT Pub. No.: WO2015/163917
PCT Pub. Date: Oct. 29, 2015

(65) Prior Publication Data
US 2017/0041493 A1    Feb. 9, 2017

(51) Int. Cl.
*H04N 1/23*     (2006.01)
*B41J 11/00*    (2006.01)
(Continued)

(52) U.S. Cl.
CPC .......... *H04N 1/2376* (2013.01); *B41J 11/009* (2013.01); *G06K 9/4604* (2013.01);
(Continued)

(58) Field of Classification Search
CPC ... B41J 11/009; G06K 9/4604; G06K 9/4642; G06K 9/4661; G06T 7/001; G06T 7/402;
(Continued)

(56) References Cited

U.S. PATENT DOCUMENTS 6,558,786 B1 * 5/2003 Jupina ................ A47G 27/0412
                                                          16/16
8,092,874 B2    1/2012 Wexler et al.
(Continued)

FOREIGN PATENT DOCUMENTS

| EP | 0013471 A1 * | 7/1980 |
| KR | 20140045701 A * | 4/2014 |
| WO | WO-03029007 | 4/2003 |

OTHER PUBLICATIONS

Matrecano, M., Porous Media Characterization by Microtomographic Image Processing, Nov. 30, 2011.

*Primary Examiner* — Fan Zhang
(74) *Attorney, Agent, or Firm* — HP Inc. Patent Department

(57) ABSTRACT

Example implementations relate to substrate permeability assessment. Some examples may determine whether voids are shown in an image of a substrate and whether there is a repeating pattern in the image. Some examples may also determine whether printing fluid would pass through the substrate during printing based on the determinations of whether voids are shown in the image and whether there is a repeating pattern in the image.

15 Claims, 10 Drawing Sheets

(51) Int. Cl.
*G06T 7/42* (2017.01)
*G06K 9/46* (2006.01)
*G06T 7/00* (2017.01)
*H04N 1/00* (2006.01)

(52) U.S. Cl.
CPC ......... *G06K 9/4642* (2013.01); *G06K 9/4661* (2013.01); *G06T 7/001* (2013.01); *G06T 7/42* (2017.01); *H04N 1/00039* (2013.01); *H04N 1/00058* (2013.01); *H04N 1/00074* (2013.01); *H04N 1/00082* (2013.01); *H04N 1/2323* (2013.01); *G06T 2207/10152* (2013.01); *G06T 2207/20056* (2013.01); *G06T 2207/30124* (2013.01); *H04N 2201/0094* (2013.01)

(58) Field of Classification Search
CPC . G06T 2207/10152; G06T 2207/20056; G06T 2207/30124; H04N 1/00039; H04N 1/00058; H04N 1/00074; H04N 1/00082; H04N 1/2323; H04N 2201/0094
See application file for complete search history.

(56) References Cited

U.S. PATENT DOCUMENTS

| | | | |
|---|---|---|---|
| 2007/0229640 A1* | 10/2007 | Ferguson | B41J 11/009 347/104 |
| 2008/0018722 A1* | 1/2008 | Mafune | C09D 11/322 347/100 |
| 2008/0252896 A1* | 10/2008 | Hayashihara | G03G 15/657 356/450 |
| 2010/0109682 A1 | 5/2010 | Liu et al. | |
| 2011/0081070 A1 | 4/2011 | Yamamoto | |
| 2012/0092409 A1 | 4/2012 | Wu et al. | |
| 2012/0139985 A1 | 6/2012 | Powers et al. | |
| 2013/0052332 A1 | 2/2013 | Roof et al. | |
| 2013/0162702 A1 | 6/2013 | Tombs et al. | |
| 2013/0293603 A1 | 11/2013 | Roof et al. | |
| 2015/0083182 A1* | 3/2015 | Lindstrom | H01G 9/2059 136/244 |
| 2015/0168134 A1* | 6/2015 | Yanai | G01N 21/00 347/16 |
| 2015/0310294 A1* | 10/2015 | Keskes | G06K 9/38 382/109 |

* cited by examiner

SUBSTRATE PERMEABILITY ASSESSMENT BASED ON AN IMAGE

BACKGROUND

A printing device, such as a printer, multifunction printer, or the like, may be used to print content onto a physical medium, such as a substrate. A substrate can be made of a number of different materials. For example, a substrate can be made of a non-permeable material such as some self-adhesive vinyls, polyvinyl chloride ("PVC") banners, papers, polyethylene ("PE") films, and/or polyproplene ("PP") films. As another example, a substrate can be made of a permeable material such as some textiles, meshes, and/or other types of woven materials. While in some instances a printing device may be capable of printing on both permeable and non-permeable materials, these two categories of materials and even particular materials within each category have different physical properties which may result in the use of different printing parameters.

BRIEF DESCRIPTION OF THE DRAWINGS

The following detailed description references the drawings, wherein.

DETAILED DESCRIPTION

Figure 1:
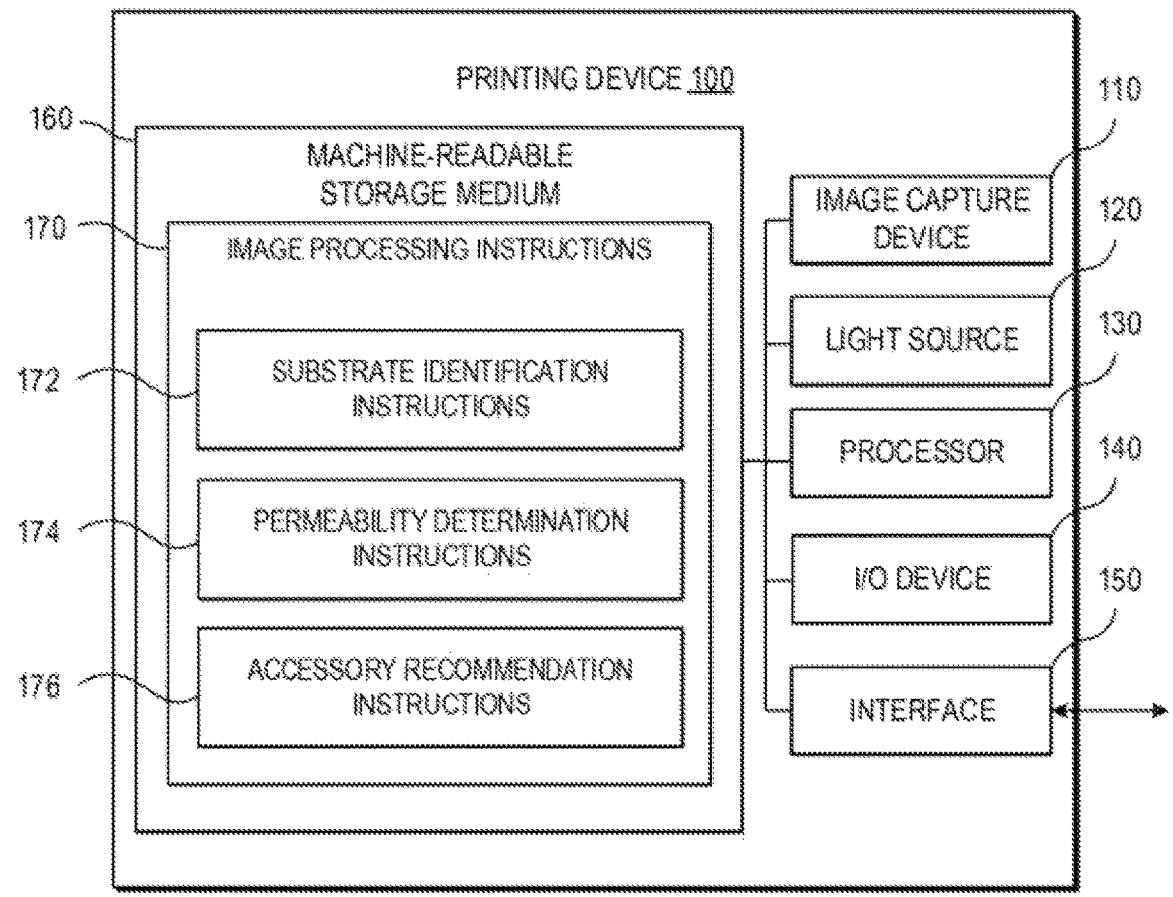
FIG. 1 is a block diagram of an example printing device consistent with disclosed implementations.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As detailed above, a substrate may be made of a number of different materials that may result in the use of different printing parameters. For example, in some instances, printing on a substrate made of a woven material, such as a textile, a mesh, or the like, does not result in printing fluid, such as ink, passing through the substrate onto the print platen. However, in other instances, printing on a woven materiel may allow excess printing fluid to pass through the substrate. This pass through of the printing fluid may not only dirty the printer resulting in premature maintenance, but may also cause printer damage due to, for example, printing fluid obstructing printer components, such as the vacuum holes in a print platen. Thus, even a user of a printer knows the type of substrate material being used, it may be unclear as to whether that mater at is permeable.

A substrate may be considered permeable if a printing fluid may pass through the substrate during printing. Traditional methods of determining whether a substrate is permeable may involve physically printing a test plot onto the substrate. To that end, a user may load the substrate into the printer and place a piece of white self-adhesive material onto the printer platen in the exact position where the test plot will be printed. After the test plot is printed (generally one meter of a black image), the user may determine if ink has passed through the substrate through a visual inspection of the color of the self-adhesive material, if the user believes the self-adhesive material remained white, the user may determine that the material is permeable; otherwise, the user may determine that the material is not permeable, if the user determined that the material is permeable, the user may also determine that a printing fluid collector accessory (e.g., an ink collector accessory) should be used to prevent printing fluid from contacting the print platen.

Not only do traditional methods for determining substrate permeability result in extensive user involvement, printer downtime, and material waste printing fluid and substrate material waste) during testing, but even if the test is performed, printing fluid may still pass through the substrate. For example, the user may analyze the test plot incorrectly, or the porosity grade of the material may be low enough that a larger test image would be needed to accurately determine whether the substrate is permeable. Additionally, a user may not always run the test or may choose not to use the printing fluid collector accessory even if the test results are accurate. Accordingly, to help prevent printer damage, a printing device should be able to determine the permeability of a substrate without substantial user involvement and/or prevent printing on a permeable substrate without the use of an appropriate accessory.

Examples disclosed herein may provide substrate permeability assessment. To this end, example implementations disclosed herein may determine substrate permeability by analyzing an image of a substrate. For example, some implementations may include an image sensor that captures an image of a substrate. Additionally, some implementations may identify the type of substrate whether the substrate is woven) and/or a whether the substrate is permeable based on the image. For example, in some implementations, the image may be analyzed determine whether a number of voids are present in the image and/or whether there is a repeating pattern in the image. Furthermore, in some examples, a number representing an amount of voids shown in the image may be compared against a threshold value to determine if the substrate may be permeable. Moreover, in some examples, a printing device may be prevented from applying printing fluid to the substrate if it is determined that the substrate is woven and/or permeable.

Referring now to the drawings, FIG. 1 is a block diagram of an example printing device 100 consistent with disclosed implementations. Printing device 100 may be implemented in various ways. For example, printing device 100 may be an inkjet printer, a laser printer, a UV printer, a solvent printer, a plotter, a computing system and/or any other type of device that can produce content (e.g. images, text, etc.) on a print medium. In the example shown in FIG. 1, printing device 100 may include an image capture device 110, a light source 120, a processor 130, an input/output device 140, an interface 150 and a machine-readable storage medium 160.

Image capture device 110 may be any device that facilitates the capture of an image. For example, image capture device 110 may be an optical sensor, an image sensor, a digital camera, a video camera, a scanner, and/or any other type of image capture device, in some implementations, image capture device may 110 may capture an image of a substrate and provide the captured image and/or data relating to the captured image to a storage device and/or to another component for processing. For example in some implementations image capture device 110 may capture an image of a substrate under a number of image capture conditions using a particular illumination level) and transmit the image and/or data relating to the image to machine-readable storage medium 160 for processing by processor 130. While in the example shown in FIG. 1 image capture device 110 may be integrated with printing device 100 (e.g., located on a print platen, an operating panel, and/or another location of printing device 100), image capture device 110 may be a stand-alone component or collection of components and/or may be integrated with another device. An example of an image capture device integrated with a printing device consistent with disclosed implementations is discussed in more detail below, with respect to, for example, FIGS. 2A and 2B.

Light source 120 may be any light source that illuminates an object, such as a substrate. For example, light source 120 may be a laser, a light emitting diode, an organic light emitting diode, an ultraviolet light, a fluorescent tube, and/or any other type of light source. In some implementations, light source 120 may function to illuminate a substrate so that at least one image of the substrate may be captured by an image capture device, such as image capture device 110. For example, in some implementations, light source 120 may be capable of producing varying light so that image capture device 110 may capture at least one image of the substrate at a particular illumination level and/or at different illumination levels. Light source 120 may be a stand-alone component or collection of components, and/or may be integrated with another device (e.g., integrated with image capture device 110).

Processor 130 may be at least one processing unit (CPU), microprocessor, and/or another hardware device to execute instructions to perform operations. For example, processor 130 may fetch, decode, and execute image processing instructions 170 (e.g., instructions 172, 174, and/or 176) stored in machine-readable storage medium 160 to perform operations related to disclosed examples.

I/O device 140 may be at least one input/output device that allows data to be received and/or transmitted by printing device 100. For example, I/O device 140 may include at least one input device that enables data to be input by a user, such as a keyboard, a touchscreen, a mouse, a trackball, a joystick, and/or any other suitable type of input device. As another example, I/O device 140 may include at least one output device that allows data to be output to a user, such as a display device, a speaker device, and/or any other suitable type of output device.

In some implementations, I/O device 140 may include a display device that presents information, such as a user interface, to a user operating printing device 100. For example, printing device 100 may present operating screens with menus of different functions, such as menus relating to assessing a substrate that a user desires to load into printing device 100, and/or menus relating to assessing a substrate that is already loaded into printing device 100. In some implementations, a user may select among the functions via an input device of I/O device 140. Additionally, in some implementations, I/O device 140 may display and/or present an alert to a user operating printing device 100. For example, I/O device 140 may present an alert to the user if printing device 100 determines that a substrate is woven and/or determines that the substrate permeable.

Interface device 150 may be any device that facilitates the transfer of information between printing device 150 and external components, such as another printing device, a scanner, a desktop computer, a laptop computer, a tablet computing device, a mobile phone, a server, and/or any other suitable type of device. In some examples, interface device 150 may include a network interface device that allows printing device 100 to receive and send data to and from a network. For example, interface device 150 may retrieve and process data related to an image of a substrate captured by an external image capture device.

Machine-readable storage medium 160 may be any electronic, magnetic, optical, or other physical storage device that stores executable instructions. Thus, machine-readable storage medium 160 may be, for example, Random Access Memory (RAM), Electrically-Erasable Programmable Read Only Memory (EEPROM), a storage drive, an optical disc, and the like. In some implementations, machine-readable storage medium 160 may be a non-transitory computer-readable storage medium, where the term "non-transitory" does not encompass transitory propagating signals. Machine-readable storage medium 160 may be encoded with instructions that, when executed by processor 130, perform operations consistent with disclosed implementations. For example, machine-readable storage medium 160 may include image processing instructions 170 that perform operations that may classify substrate as permeable. In the example shown in FIG. 1, machine-readable storage medium 160 may include substrate identification instructions 172, permeability determination instructions 174, and accessory recommendation instructions 176.

Substrate identification instructions 172 may function to identify a type substrate. For example, when substrate identification instructions 172 are executed by a processor, such as processor 130 of print device 100, substrate identification instructions 172 may cause processor 130 and/or another processor to capture an image of a substrate and/or determine whether the substrate is woven based on the image. In some examples, substrate identification instructions 172 may cause processor 130 of print device 100 and/or another processor to analyze the image to determine if there is a pattern in the image, such as a repeating pattern representing a weave pattern of a woven substrate (e.g., a repeating pattern representing the frequency and/or periodicity of a weave pattern). In some implementations, substrate identification instructions 172 may also cause a processor to store the image and/or data related to the determination of the substrate type in machine-readable storage medium 160 and/or n another storage device. Examples of these analyses are described in further detail below with respect to, for example, FIGS. 4-6.

Permeability determination ins ructions 174 may function to determine if a substrate is permeable. For example, when permeability determination instructions 174 are executed by a processor, such as processor 130 of printing device 100, permeability determination instructions 174 may cause the processor to determine if a substrate is permeable based on an image of the substrate. In some examples, permeability determination instructions 174, when executed by processor 130 and/or another processor, may determine whether the substrate is permeable by determining whether there are a number of voids shown in the image. In some examples, permeability determination instructions 174 may also cause processor 130 and/or another processor to store the determination of whether the substrate is permeable and/or information related to the determination in machine-readable storage medium 160 and/or another storage device. Examples of these analyses are described in further detail below with respect to, for example, FIGS. 4, 6A-6D, 8, and 9.

Accessory recommendation instructions 176 may function to determine whether a printing accessory should be used. For example, when accessory recommendation instructions 176 are executed by a processor, such as processor 130 of printing device 100, accessory recommendation instructions 176 may cause processor 130 and/or another processor to recommend or to not recommend an accessory based on the determination of the identity of the substrate and/or the determination of whether the substrate is permeable. For example, if the substrate is woven and permeable, accessory recommendation instructions 176, when executed by processor 130, may recommend that a printing accessory be used when printing on the substrate. As another example, if the substrate is not woven and/or if the substrate is not permeable, accessory recommendation instructions 176, when executed by a processor, may not recommend that a printing accessory be used when printing on the substrate. In some implementations, accessory recommendation instructions 176 may cause processor 130 and/or another processor to prohibit printing on the substrate without a printing accessory. For example, in some implementations printing device 100 may including a printing unit having a combination of hardware and/or programming for applying printing fluid to the substrate, and accessory recommendation instructions 176, when executed by a processor, may function to prevent the printing unit from applying printing fluid to the substrate without the use of the recommended printing accessory. Moreover, in some implementations, accessory recommendation instructions 176, when executed by a processor, may generate an alert that may be displayed on a display device, such as device I/O device 140. Examples of these analyses are described in further detail below with respect to, for example, FIGS. 4 and 9.

Moreover, the arrangement illustrated in FIG. 1 is simply an example, and printing device 100 may be implemented in a number of different configurations. For example, while FIG. 1 shows one image capture device 110, light source 120, processor 130, I/O device 140, interface 150, and machine-readable storage medium 160, printing device 100 may include any number of components 110, 120, 130, 140, 150, and 160 as well as other components not depicted in FIG. 1. For example, printing device 100 may omit any of components 110, 120, 130, 140, 150, and 160 and/or combine at least one of components 110, 120, 130, 140, 150, and 160 (e.g., light source 120 may be part of image capture device 110, I/O device 140 may not include an input device, etc.). As another example, while FIG. 1 shows that each of components 110, 120, 130, 140, 150, and 160 are communicatively connected, at least one of components, 110, 120 130, 140, 150, and 160 may not be communicatively connected to other components of printing device 100 or to external components. As yet another example, while FIG. 1 shows that each of components 110, 120, 130, 140, 150, and 160 are internal to printing device 100, at least one of components 110, 120, 130, 140, 150, and 160 may be external to printing device 100. For example, machine-readable storage medium 160 including processing instructions 170 may be located in a computing system external to printing device 100.

Figure 2A:
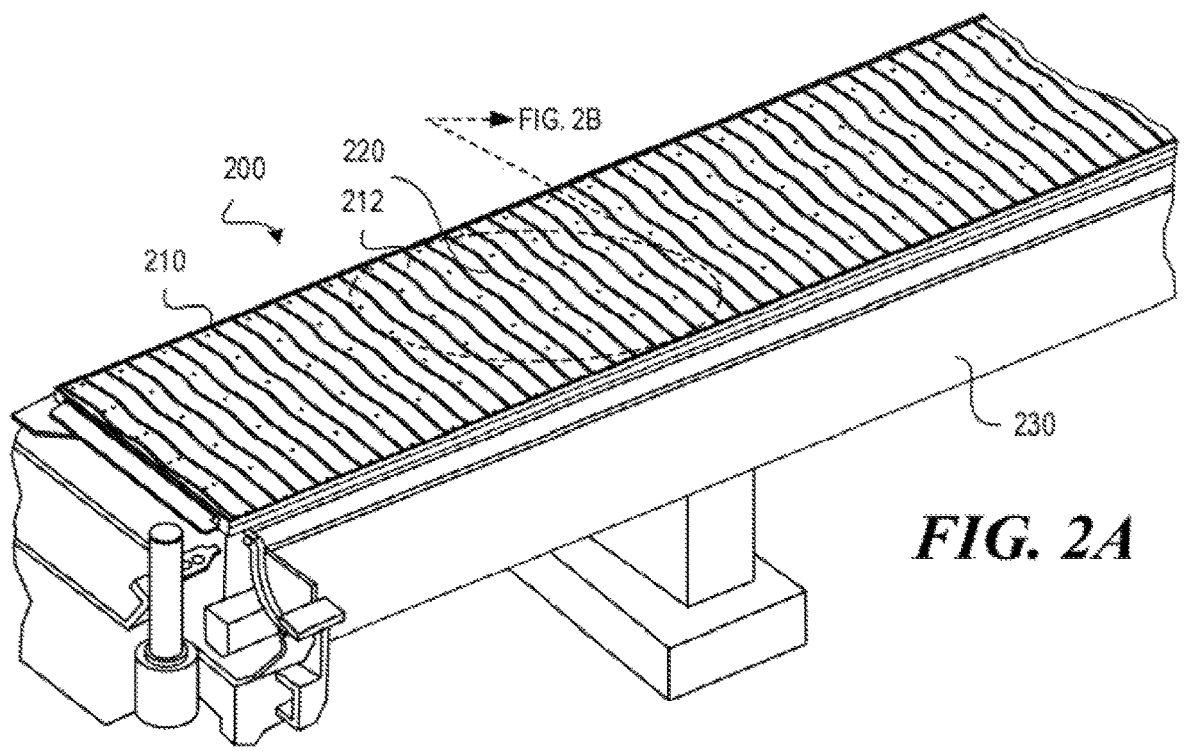
FIG. 2A is an orthogonal view of an example printing device consistent with disclosed implementations.

FIG. 2A is an orthogonal view of an example printing device 200 consistent with disclosed implementations. In certain aspects, printing device 200 may correspond to printing device 100 of FIG. 1. For example, printing device 200 may perform operations that are the same as or similar to those performed by printing device 100 of FIG. 1. As shown in FIG. 2A, printing device 200 may include a print platen 210, an image capture device 220 located on the print platen (shown in detail in FIG. 2B), and a vacuum beam 230. Print platen 210 may function to hold the substrate during a printing operation. In some implementations, print platen 210 may include a number of holes 212 (shown in detail in FIG. 2B) for pulling the substrate to the surface of the print platen 210 using suction. For example, printing device 200 may include a vacuum pump (not shown) to generate a vacuum in the cavity or cavities enclosed by print platen 210 and/or vacuum beam 230. In some implementations, when air is vacuumed through vacuum beam 230, air may be pulled in through holes 212 in print platen 210, creating suction that may function to hold a substrate to print platen 210.

Figure 2B:
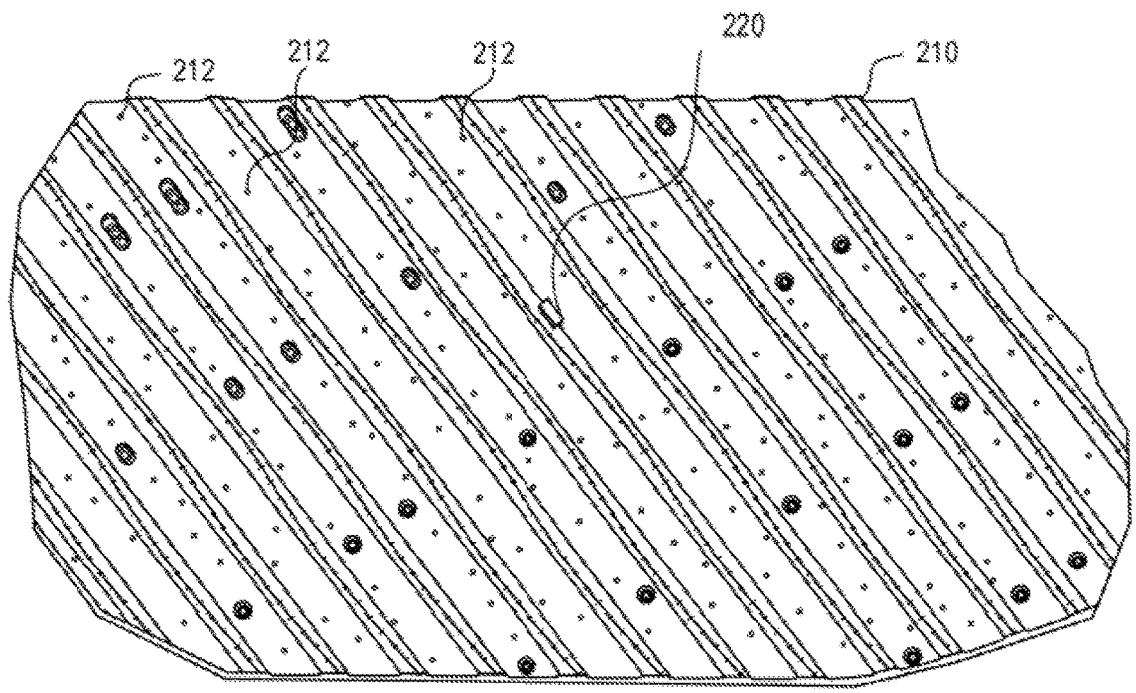
FIG. 2B is a magnified view of an example print platen of the example printing device shown in FIG. 2A consistent with disclosed implementations.

FIG. 2B is a magnified view of an example print platen 210 of the example printing device 200 shown in FIG. 2A consistent with disclosed implementations. As shown in FIG. 2B, image capture device 220 may be positioned on print platen 210 such that it does not obstruct a vacuum hole 212. In the example shown in FIGS. 2A and 2B, image capture device 220 may be any type of image capture device. For example, in some implementations, image capture device 220 may be an optical sensor including an image sensor, a window, and a fiducial etched into the Window (not shown in FIGS. 2A-28). The fiducial may be a geometric shape (e.g., a circle, a square, etc.) or other visual feature that may be used as a reference point for measurement. In some implementations, when a substrate is placed over image capture device 220, image capture device 220 may capture an image of the substrate. Since, in some implementations, a fiducial may be etched into a window of image capture device 220, an image captured by image capture device 220 may, in some instances, include a representation of the fiducial in the image. An example of an image inducting a representation of a fiducial consistent with disclosed implementations may be seen, for example, in FIG. 7A. While the example, printing device 200 shown in FIGS. 2A and 28 includes image capture device 220 positioned on the print platen, image capture devices consistent with disclosed examples may be positioned at any location (e.g., at a location on print platen 210 that obstructs a vacuum hole, on a housing of printing device 200, etc.).

Figure 3:
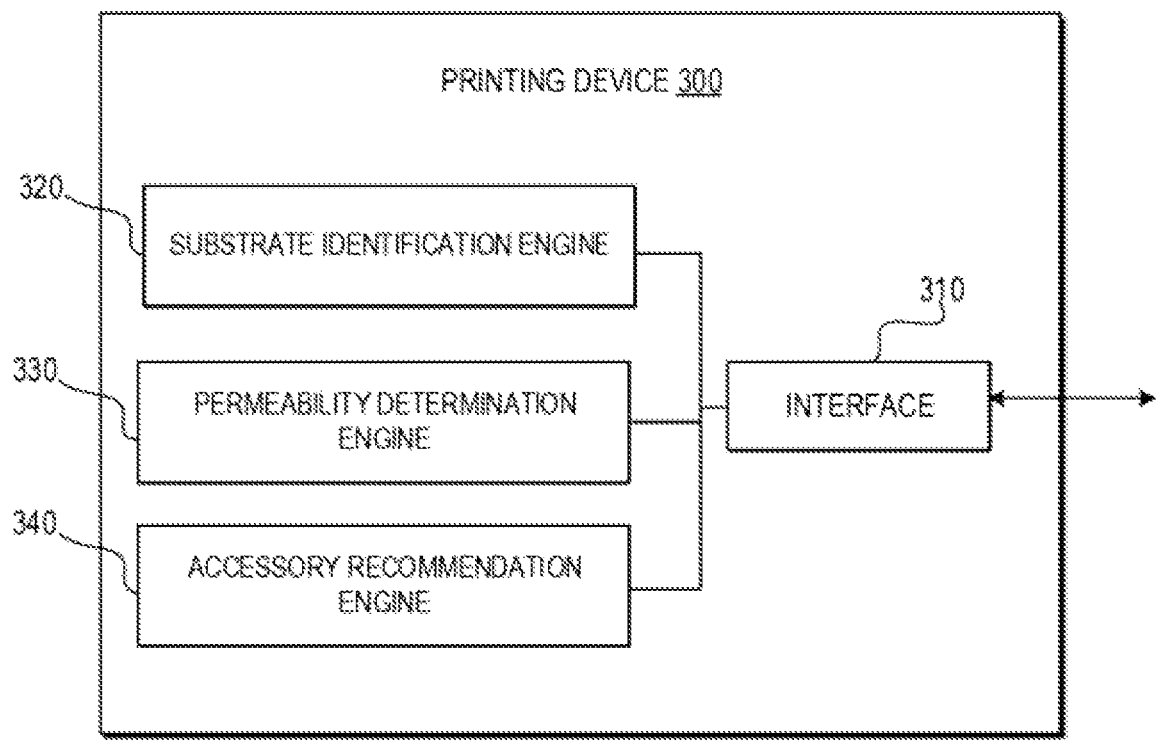
FIG. 3 is a block diagram of an example printing device consistent with disclosed implementations.

FIG. 3 is a block diagram of an example printing device 300 consistent with disclosed implementations. In certain aspects, printing device 400 may correspond to printing device 100 of FIG. 1 and/or printing device 200 of FIG. 2. Printing device 300 may be implemented in various ways. For example, printing device 300 may be a printer, a special purpose computer, a server, a mainframe computer, a computing device executing instructions that receive and process information and provide responses, and/or any other type of computing system. In the example shown in FIG. 3, printing device 300 may include, an interface device 310, a substrate identification engine 320, a permeability determination engine 330 and an accessory recommendation engine 340.

Interface device 310 may be any device that facilitates the transfer of information between printing device 300 and external components. In some examples, interface device 310 may include a network interface device that allows printing device 300 to receive and send data to and from a network. For example, interface device 310 may retrieve and process data related to determining whether a substrate is permeable from a printer external to printing device 300.

Engines 320, 330, and 340 may be electronic circuitry for implementing functionality consistent with disclosed examples. For example, engines 320, 330, and 340 may represent combinations of hardware devices and programming to implement functionality consistent with disclosed implementations. In some examples, the functionality of engines 320, 330, and 340 may correspond to operations performed by printing device 100 of FIG. 1 and/or printing device 200 of FIG. 2, such as operations performed when image processing instructions 170 are executed by processor 130. In FIG. 3, substrate identification engine 330 may represent a combination of hardware and programming that performs operations those performed when processor 130 executes substrate identification instructions 172. Similarly, permeability determination engine 330 may represent a combination of hardware and programming that performs operations similar to those performed when processor 130 executes permeability determination instructions 174, and accessory recommendation engine 340 may represent a combination of hardware and programming that performs operations similar to those performed when processor 130 executes accessory recommendation instructions 176.

Figure 4:
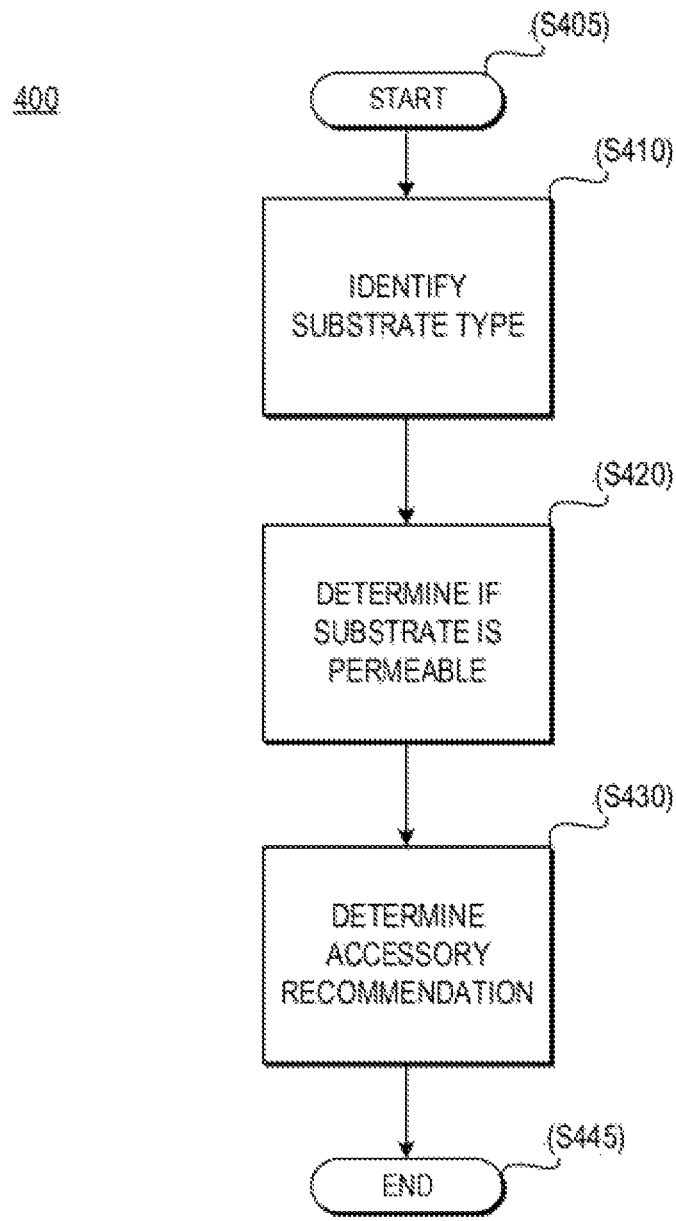
FIG. 4 is a flow chart of an example process for substrate permeability assessment consistent with disclosed implementations.

FIG. 4 is a flow chart of an example process 400 for substrate permeability assessment consistent with disclosed implementations. Although execution of process 400 is described below with reference to printing device 100 of FIG. 1 and/or specific components of printing device 100, other suitable systems and devices for execution of at least one step of process 400 may be used. For example, processes described below as being performed by printing device 100 may be performed by printing device 200, printing device 300 and/or any other suitable device. Process 400 may be implemented in the form of executable instructions stored on a storage device, such as a machine-readable storage medium, and/or in the form of electronic circuitry. Process 400 may be performed based on a user input or may be performed automatically (e.g., when a substrate is loaded into a printing device).

Process 400 may start (step S405) when a substrate has been placed in a location that can be accessed by an image capture device. For example, a substrate may be positioned at a location on print device 100 where image capture device 120 may capture an image of the substrate. In some implementations, the material may automatically be placed in the proper location when the substrate is loaded into a printing device, such as printing device 100, in some implementations, the substrate may be placed in the location by the user. For example, a user may take a small piece of the substrate and position the piece at the appropriate location.

Once the substrate has been placed at the proper location, process 400 may include identifying the substrate type (step S410). For example, printing device 100 may determine whether or not the substrate is a woven substrate. In implementations, printing device 100 may determine whether or not the substrate is woven based on an image of the substrate. For example, printing device 100 may capture an image (e.g., a first image) of the substrate and/or analyze the image to determine if the substrate is woven. In some implementations, printing device 100 may determine that the substrate is woven if printing device 100 determines that there is a repeating pattern in the image. Additionally, in some implementations, printing device 300 may capture a second image of the substrate that differs from the image, and analyze the second image to determine if the substrate is woven. Examples of steps that may be involved with identifying the substrate type are discussed in greater detail below with respect to, for example, FIGS. 5-7C.

Process 400 may also include determining whether the substrate is permeable (step S420) based on an image of the substrate. For example printing device 100 may analyze an image of the substrate to determine if a number of voids are present in the image. In some implementations, printing device 100 may compare a number representing an amount of voids shown in the image to a threshold value. For example, if the number exceeds the threshold value, then printing device 100 may determine that the substrate is permeable. If not, then printing device 100 may determine that the substrate is not permeable. Additionally, in some implementations, printing device 100 may analyze a second image of the substrate that differs from the image to determine if the substrate is permeable. Examples of steps that may be involved with determining whether the substrate is permeable are discussed in greater detail below with respect to, for example, FIGS. 8 and 9.

Process 400 may also include determining an accessory recommendation (step S430). For example, printing device 100 may recommend a printing accessory based on the determination of the identity of the substrate in step S410 and/or the determination of whether the substrate is permeable in step S420 of process 400. In some instances, printing device 100 may recommend a printing fluid collector accessory be used with the printing device if the substrate is a woven substrate and/or the substrate is permeable, and/or may prohibit printing on the substrate without use of the accessory. For example, if the substrate is being assessed while the substrate is loaded in printing device 100, printing device 100 may prevent a printing unit of printing device 100 from applying printing fluid to the substrate until the accessory is attached to or otherwise used by printing device 100. Examples of steps that may be involved with determining an accessory recommendation are discussed in greater detail below with respect to, for example, FIG. 10.

After the type of substrate is identified (step S410), the permeability of the substrate is determined (step S420), and/or the accessory recommendation is determined (step S430), process 400 may end (step S445).

Figure 5:
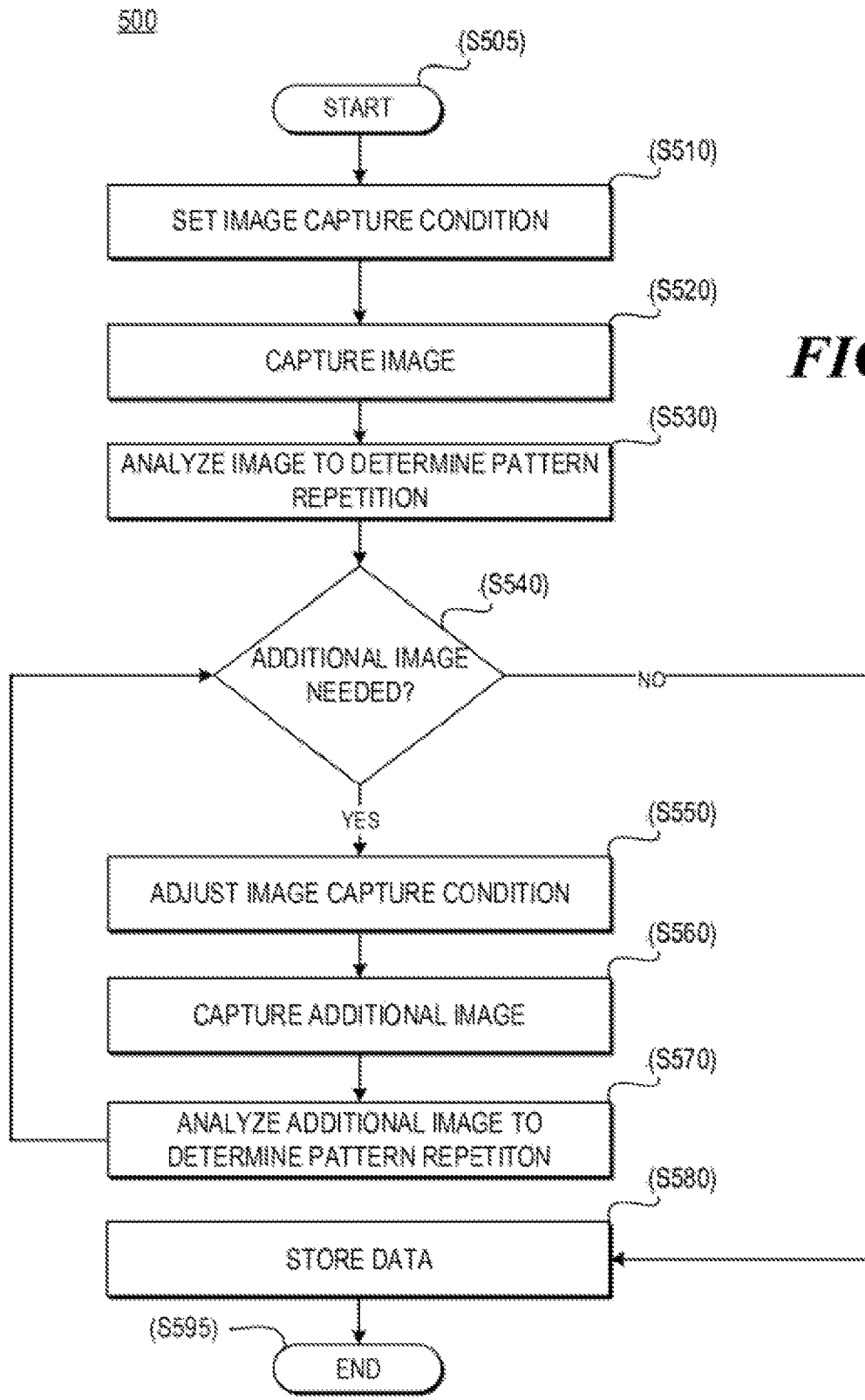
FIG. 5 is a flow chart of an example process for identifying a substrate type consistent with disclosed implementations.

FIG. 5 is a flow chart of an example process 500 for identifying a substrate type consistent with disclosed implementations. In certain aspects, process 500 may related to the processes associated with step S410 of FIG. 4. Although execution of process 500 is described below with reference to printing device 100 of FIG. 1 and/or specific components of printing device 100, other suitable systems and devices for execution of at least one step of process 500 may be used. For example, processes described below as being performed by printing device 100 may be performed by printing device 200, printing device 300, and/or any other suitable device. Process 500 may be implemented in the form of executable instructions stored on a storage device, such as a machine-readable storage medium, and/or in the form of electronic circuitry.

Process 500 may start (step S505) after a substrate has been positioned at a location where an image of the substrate may be captured. Once the substrate has been positioned, process 500 may include setting an image capture condition (step S510). For example, printing device 100 may set a light source (e.g., light source 120) to emit light at a particular illumination level. As another example, printing device 100 may set the substrate and/or the image capture device to be at a particular position (e.g., positioning or repositioning the substrate and/or the image capture device to be able to capture an image of a particular weaving pattern, an image at a different angle with respect to a particular weaving pattern and/or another image, etc.).

Process 500 may also include capturing an image of the substrate (step S520). For example, printing device 100 may capture an image (e.g., a first image) of the substrate under a particular set of image capture conditions (e.g., the image capture condition set in step S510). The image may be an image of a portion of the substrate or may be an image of the entire substrate, and may be any size and/or shape. In some implementations, the image may be a close-up image of the substrate such that voids, repeating patterns, and/or the lack of voids and repeating patterns are present in the image. For example, the first image may be a rectangular image 96 pixels wide and 512 pixels long, and may represent a portion of the substrate that is approximately 0.04 inches wide and 0.20 inches long. An example of an image of a substrate captured by an image capture device consistent with disclosed implementations is shown and described in further detail below with respect to, for example, FIG. 7A.

Process 500 may also include analyzing an image of the substrate to determine whether there is a repeating pattern in the image (step S530). For example, printing device 100 may determine whether there is a repeating pattern of voids shown in an image (e.g., a grid-like pattern of voids, voids corresponding to a frequency and/or periodicity of a weaving pattern of a woven substrate, etc). In some implementations, process 500 may determine whether there is a repeating pattern of voids shown in the image by applying a mathematical transform and/or other processing to the image. For example, printing device 100 may analyze the image using a Fast Fourier Transform ("FFT"). In some implementations, the FFT may be used to determine the number of voids shown in a first image direction (e.g., a horizontal direction), the number of voids shown in a second image direction (e.g., a vertical direction), and/or the gray difference between the void(s) (if any) and the substrate liner. For example, printing device 100 may analyze the results of the FFT to determine the peak in the FFT with the largest amplitude, and compare the amplitude to a threshold value. If the amplitude of the largest peak exceeds the threshold value, printing device 100 may determine that the substrate is woven. If not, printing device 100 may determine that the substrate is not woven. Examples of steps that may be involved with analyzing the image are discussed in greater detail below with respect to, for example, FIG. 6.

Process 500 may also include determining whether analysis of an additional image is needed (step S540). For example, printing device 100 may determine whether analysis of an additional image (e.g., a second image) is needed to identify the substrate and/or confirm whether an initial determination of the identity of the substrate is accurate. In some implementations, an additional image may never be needed. For example, printing device 100 may include instructions which, when executed by a processor, only capture a single image of the substrate. In some implementations, an additional image may always be needed. For example, in some implementations, printing device 100 may automatically capture two or more images of the substrate using the same or different image capture conditions (e.g., different illumination levels, different portions of the substrate, different extension directions of the sewing periodicity of a woven substrate, etc). The two or more images may be analyzed, and the results of the analyses may be compared to confirm that the results are similar before a printing device, such as printing device 100, may determine that the substrate is permeable.

In some implementations, an additional image may be needed if certain conditions are met. For example, printing device 100 may determine that an analysis of an additional image is needed if printing device 100 has determined that the substrate is a woven substrate and/or a permeable substrate. As another example, printing device 100 may determine if an analysis of an additional image is needed based on input by a user. For example a user may input a request to double-check the determination via an input device, such as I/O device 140 of printing device 100. As yet another example, printing device 100 may determine that an additional image needed based on whether or not the substrate is loaded into a printing device. For example, if the substrate is not loaded into the printing device (e.g., if a user simply positions a small crop of substrate material in a position where the substrate could be captured by an image capture device) printing device 100 may determine that an additional image is needed, and may rotate or request the rotation of the substrate and/or the image capture device to capture a second image at a different angle (e.g., relate the substrate 90 degrees). As yet another example, an additional image may be needed based on the illumination level of the initial image capture. For example printing device 100 may capture an additional image of the substrate at a different (e.g., a second) illumination level (e.g., at a level that is double the initial illumination level) to confirm that the pattern(s) and/or void(s) that were or were not detected in the initial image capture are still present or absent in the additional image.

As another example, printing device 100 may capture an additional image of the substrate at a different illumination level to confirm whether or not a substrate is transparent. For example, a first image of a transparent substrate captured at a first illumination level may appear as though there it no material in the image (e.g., a black image). If an image it captured using a second illumination level (e.g., a higher illumination level than the initial illumination level) the additional image may appear the same as the initial image, or may include bright spots. In some implementations, printing device 100 may analyze the first image and the second image to determine whether the substrate is transparent. For example, printing device 100 may determine a first number representing the total number of pixels in a particular set of tonal values (e.g., values indicating that the pixels are black) in the first image and a second number representing the total number of pixels in a particular set of tonal values (e.g., values indicating that the pixels are black) in the second image. Printing device 100 may compare the first number and the second number to determine whether the two numbers are identical or within a particular tolerance level. If so, printing device 100 may determine that the substrate is transparent. As another example, printing device 100 may determine an average gray value for the first image and an average gray value for the send image and compare it to at least one threshold. In some examples, if the average gray values for the first image and the second image exceeded the at least one threshold, printing device 100 may determine that the substrate is transparent. Accordingly, in some implementations, the analysis of an additional image may allow printing device 100 to identify a substrate as a transparent substrate.

If an additional image is not needed (step S540; no), process 500 may store data relating to the analysis of the image (step S580) (discussed in detail below). If an additional image is needed (step S540; yes), process 500 may include adjusting the image capture condition (step S550) to capture the additional image. For example, in some implementations, process 500 may include adjusting the illumination level of the light source, the position of the substrate, the position of the image capture device, the portion of the substrate being captured and/or any other suitable image capture condition.

Process 500 may also include capturing an additional image of the substrate (step S500). For example, similar to step S520, printing device 100 capture an additional image of the substrate (e.g. a second image) using the same, a similar, or a different image capture condition than the image capture condition used to capture the initial image (e.g., the additional image may be captured under the image capture conditions set in step S550). The additional image, like the initial image, may be an image of a portion of the substrate or may be an image of the entire substrate, and may be any size and/or shape. In some implementations, the additional image may be a close-up and/or magnified image of the substrate such that voids, repeating patterns, and/or the lack of voids and repeating patterns are present in the image. For example, the image may be a rectangular image 96 pixels wide and 512 pixels long and may represent a portion of the substrate that is approximately 0.04 inches wide and 0.20 inches long.

Process 500 may also include: analyzing the additional image to determine if there is a pattern in the additional image (step S570). For example, like with step S530, printing device 100 may determine whether there is a repeating pattern of voids shown in the additional image (e.g., a grid-like pattern of voids, voids corresponding to a frequency and/or periodicity of a weaving pattern of a woven substrate, etc.). In some implementations process 500 may determine whether there is a repeating pattern of voids shown in the additional image by applying a mathematical transform and/or other processing to the additional image. For example, printing device 100 may analyze the additional image using a Fast Fourier Transform ("FFT"). In some implementations, the FFT may be used to determine the number of voids shown in a first image direction (e.g., a horizontal direction), the number of voids shown in a second image direction (e.g., a vertical direction), and/or the gray difference between the void(s) (if any) and the substrate liner. For example, printing device 100 may analyze the results of the FFT to determine the peak in the FFT with the largest amplitude, and compare the amplitude to a threshold value. The threshold value may be the same as or differ from the threshold value used in step S530. If the amplitude of the largest peak exceeds the threshold value, printing device 100 may determine that the substrate is woven. If not, printing device 100 may determine that the substrate is not woven.

Like with step S520, examples of steps that may be involved with analyzing the additional image are discussed in greater detail below with respect to, for example, FIG. 6. After the additional image is analyzed, process 600 may determine whether other images are needed by returning to step S540.

If an additional image is not needed (step S540; no) process 500 may also store data associated with the identification of the substrate type in a storage device (step S580). For example, printing device 100 may provide data regarding the identification of the substrate type to a storage device, such as a machine-readable medium, and/or another device for additional processing. Examples of stored data may include, for a particular image the substrate type, the captured image, information relating to the image capture condition, information related to the mathematical transform and/or processing used to analyze the image, information related to the results of the mathematical transform and/or processing, whether there is a repeating pattern in the image, the number of voids shown in the first image direction, the number of voids shown in the second image direction, the amplitude of the largest peak of the mathematical transform in the first image direction, the amplitude of the largest peak of the mathematical transform in the second image direction, the difference in gray levels between any voids shown in the image and the liner, and/or any other data related to identifying the type of substrate. After the data is stored, process 500 may end (step S595).

Figure 6:
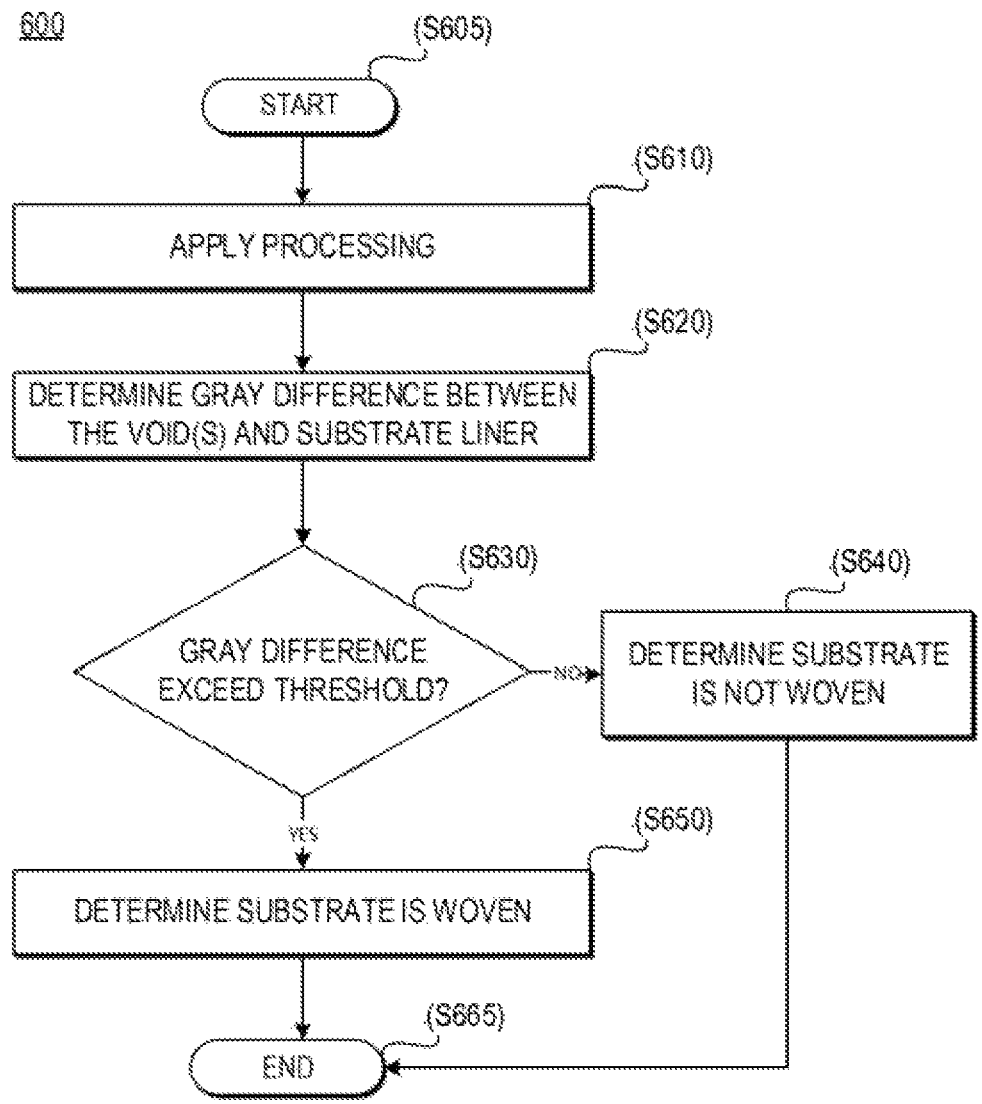
FIG. 6 is a flow chart of an example process for determining whether an image of a substrate includes a repeating pattern consistent with disclosed implementations.

FIG. 6 is a flow chart of an example process 600 for determining whether an image of a substrate includes a repeating pattern consistent with disclosed implementations. In certain aspects, process 600 may relate to the processes associated with step S410 of FIG. 4, step S530 of FIG. 5, and/or step S570 of FIG. 5, in some implementations, process 600 may determine whether the image of the substrate includes a pattern by analyzing the image using a mathematical transform and/or other processing, such as a FFT. Although execution of process 600 is described below with reference to piloting device 100 of FIG. 1, other suitable systems and devices for execution of at least one step of process 600 may be used. For example, processes described below as being performed by printing device 100 may be performed by printing device 200, printing device 300, and/or any other suitable device. Process 600 may be implemented in the form of executable instructions stored on a machine-readable storage medium and/or in the form of electronic circuitry.

Process 600 may start (step S605) after an image of the substrate has been captured by an image capture device. For example, process 600 may start after an image (e.g., a first image) is captured by an image capture device. In some implementations, process 600 may including accessing the image to perform substrate permeability assessment. For example, printing device 100 may retrieve the image from image capture device 110 and/or from data stored in a storage device, such as machine-readable medium 160, in some implementations, the stored data may correspond to the data stored in step S580 of FIG. 5.

Process 600 may also include applying a mathematical transform and/or processing to the image (step S610). For example, process 600 may include applying mathematical processing, such as shape recognition through contour matching, etc, to the image. In some implementations, the mathematical processing may include applying a FFT. For example, printing device 100 may apply a FFT (e.g., a bidimensional FFT) to convert the image from the image (spatial) domain to the frequency domain and decompose the image into sine and cosine components of various amplitudes and phases. The various amplitudes and phases may be analyzed by printing device 100 to determine whether patterns exist in the image and/or how often patterns are repeated. For example, in some implementations, printing device 100 may automatically determine the peak in the FFT with the largest amplitude in a first direction (e.g., a horizontal direction) of the image and automatically determine the peak in the FFT with the largest amplitude in a second direction (e.g., a vertical direction) of the image.

In some implementations, each peak in the FFT may have associated x, y, and z values. For example, the x value of the peak with the largest amplitude in the first direction may correspond to the number of voids shown in the first direction. Similarly, the y value of the peak with the largest amplitude in the second direction may correspond to the number of voids shown in the second direction. The z value (e.g., the amplitude) of each peak may represent the difference, in gray level, between the void(s) (if any) and the liner of the substrate. Accordingly, in some examples, printing device 100 may use the FFT to determine the difference, in gray level, between any voids and the liner of the substrate (step S620) by determining the amplitude of the largest peak in the first image direction and/or the amplitude of the largest peak in the second image direction. An example of an application of a FFT to an image consistent with disclosed implementations is discussed in further detail below with respect to, for example, FIGS. 7A-7C.

Process 600 may include comparing at least one of the amplitudes with a threshold value (step S630). For example, printing device 100 and/or another device may set a threshold value that defines an acceptable peak amplitude to determine that the substrate is woven. In some implementations, there may be a single threshold value, or there may be multiple threshold values based on various criteria (e.g., based on whether the peak is the largest peak in the first direction, whether the peak is the largest peak in the second direction, a particular image capture condition, etc.) The amplitude of the highest peak in the first direction and/or the second direction of the FFT may then be compared with the appropriate threshold value (e.g., both amplitudes may be compared, the largest amplitude between the two may be compared, etc.). If the amplitude of the peak does not exceed the threshold value (step S630; no), then printing device 100 may determine that the substrate is not woven (step S640). If the amplitude exceeds the threshold (step S630, yes) then printing device 100 may determine that toe substrate is woven (step S650). Printing device 100 may then provide data regarding the determination of whether the substrate is woven to a storage device, such as a machine-readable medium, and/or another device for additional processing. After a determination has been made regarding whether the substrate is woven, process 600 may end (step S665).

Figure 7A:
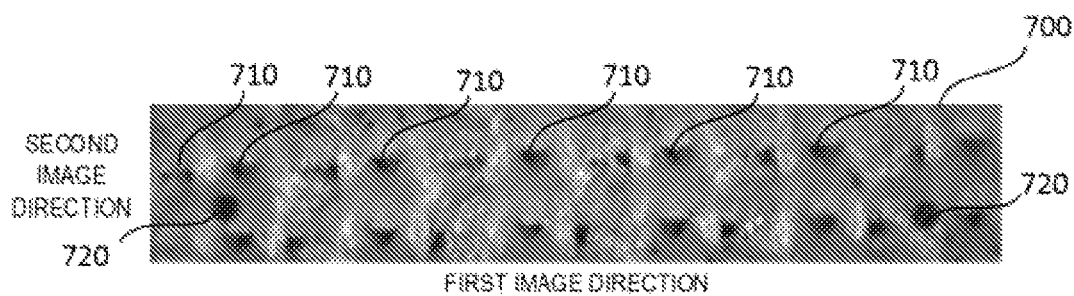
FIG. 7A is an example of an image of a substrate captured by an image capture device consistent with disclosed implementations.
Figure 7B:
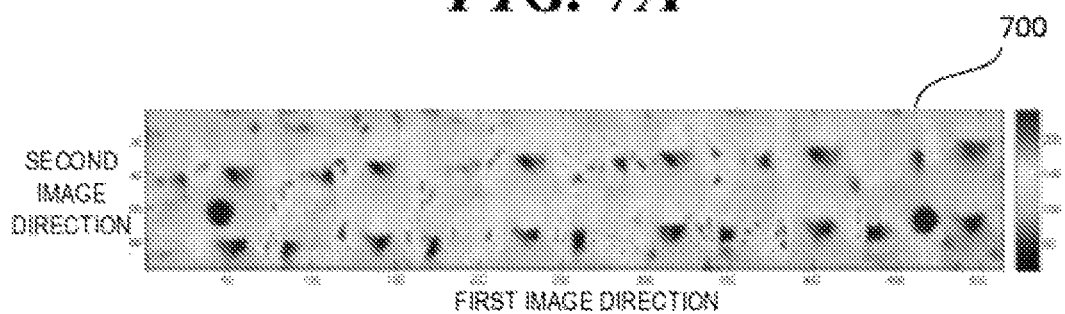
FIG. 7B is an example of a color scale representation of the image shown in FIG. 7A consistent with disclosed implementations.
Figure 7C:
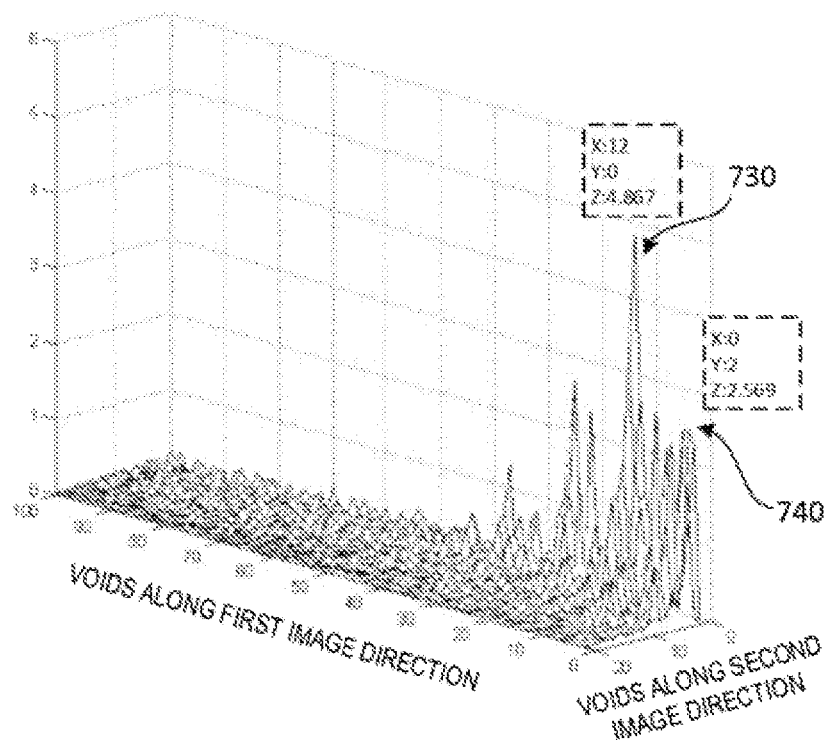
FIG. 7C is an example of an application of a FFT to the image shown in FIG. 7A consistent with disclosed implementations.

FIGS. 7A-7C illustrate an example of an application of a FFT to an image of a substrate consistent with disclosed implementations. FIG. 7A is an example of an image 700 of a substrate (in this example, a woven substrate) captured by an image capture device, such as image capture device 110 of printing device 100. As shown in FIG. 7A, image 700 may include a number of pixels in a first image direction (e.g., a horizontal direction) and a number of pixels in a second image direction (e.g., a vertical direction) that depict a number of voids 710 in the substrate. While the image shown in FIG. 7A is in grayscale and is generally rectangular, images consistent with the disclosed implementations are not limited to the example shown in FIG. 7A (e.g., they may be in color may be any size and/or shape, etc.). Furthermore, while image 700 includes two fiducials 720, images consistent with disclosed examples may include any number of fiducials (e.g., 0, 1, 3, 10, etc.).

FIG. 7B is an example of a color scale representation of the image shown in FIG. 7A consistent with disclosed implementations. As shown in FIG. 7B, image 700 may include a significant amount of information. For example, each pixel in the image may include a first value and a second value the location of a particular pixel in a first image direction and a location of the particular pixel in a second image direction). As another example, each pixel in the image may include a third value, which may represent a tonal value (e.g., a color, a gray level, etc.) of a particular pixel. For example, as shown in FIG. 7B, the third value may range between 0 (e.g., black) and 256 (e.g., white). This (and other) information contained in the image may be analyzed by printing device 100 using a FFT to automatically determine the identity of the substrate and/or whether the substrate is permeable.

FIG. 7C is an example of an application of a FFT to the image shown in FIG. 7A consistent with disclosed implementations. As shown in FIG. 7C, when a FFT is performed on image 700, printing device 100 may generate a graphical representation of the image. The x-axis of the FFT may represent the number of voids shown in the first direction of image 700, the y-axis of the FFT may represent the number of voids shown in second direction of image 700, and the axis of the FFT may represent the gray difference between the voids and the liner of the substrate. The FFT may include a number of peaks which signify whether there is a gray level variation between pixels in the image.

In the example shown in FIG. 7C, the peak with the largest amplitude in the x-axis of the FFT is peak 730 and that the peak with the largest amplitude in the y-axis of the FFT is peak 740. In some implementations, printing device 100 may be able to automatically determine the largest peaks (peaks 730 and/or 740 in FIG. 7C) and their associated x, y, and z values. As shown in FIG. 7C, (the peak with the largest amplitude in the x-axis of the FFT) indicates that there are 12 voids shown in first direction of the image and peak 740 (the peak with the largest amplitude in the y-axis of the FFT) indicates that there are 2 voids shown in the second directions of the image. Accordingly, based on these results, printing device 100 may automatically determine that there is approximately a 12×2 grid of voids shown in image 700. Furthermore, printing device 100 may compare the amplitudes of peaks 730 and 740 (4.867 and 2.569, respectively) against an appropriate threshold value to determine whether or not the material is woven (an example of which is described above with respect to step 630 of FIG. 6).

Figure 8:
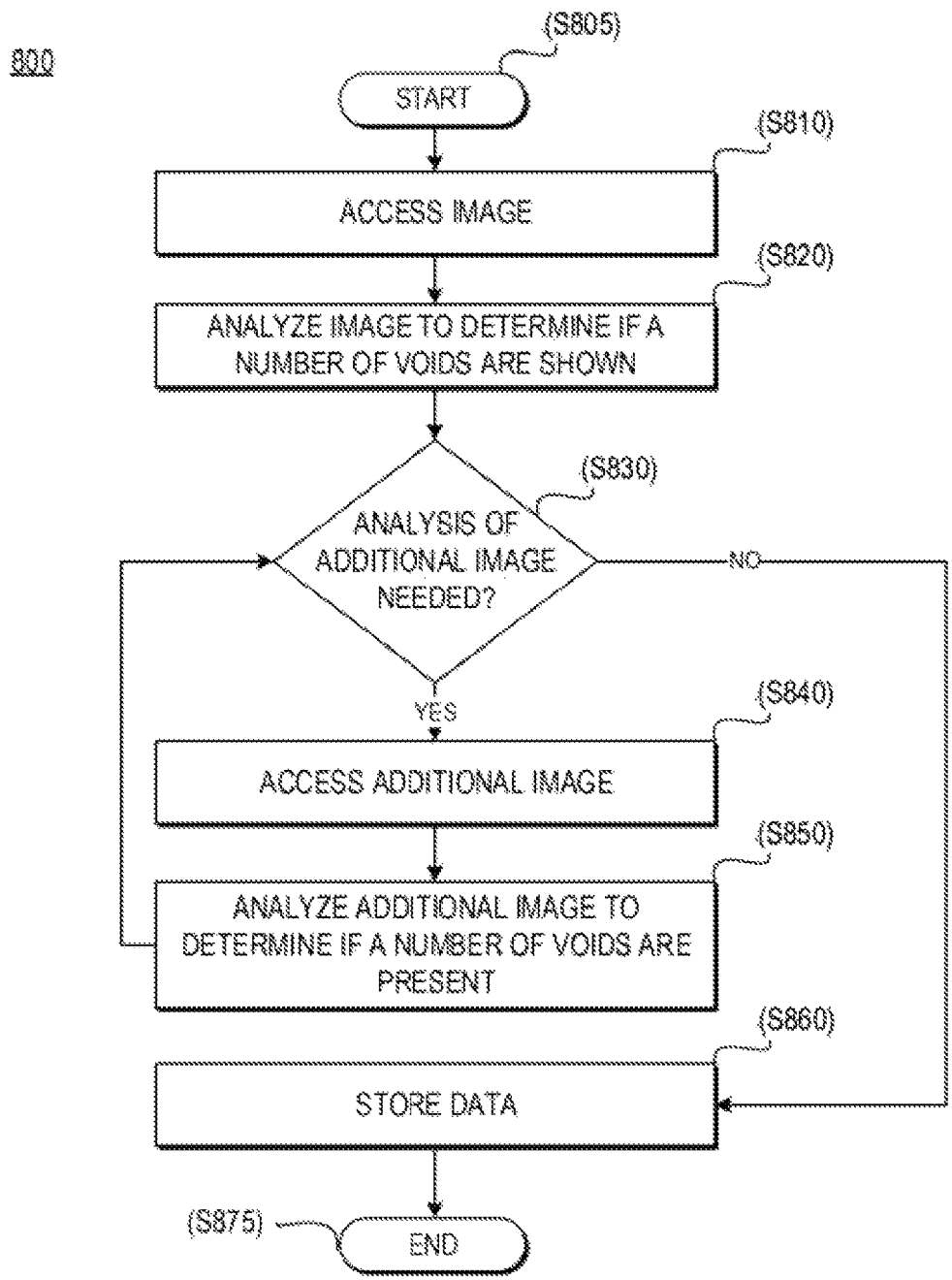
FIG. 8 is a flow chart of an example process for determining if a substrate is permeable consistent with disclosed implementations.

FIG. 8 is a flow chart of an example process 800 for determining if a substrate is permeable consistent with disclosed implementations. In certain aspects, process 800 may relate to the processes associated with step S420 of FIG. 4, in some implementations, process 800 may determine if a substrate is permeable based on an image of the substrate. For example, process 800 may analyze an image to determine whether a number of voids are present in the image. Although execution of process 800 is described below with reference to printing device 100 of FIG. 1, other suitable systems and devices for execution of at least one step of process 800 may be used. For example, processes described below as being performed by printing device 100 may be performed by printing device 200, printing device 300 and/or any other suitable device. Process 800 may be implemented in the form of executable instructions stored on a machine-readable storage medium and/or in the form of electronic circuitry.

Process 800 may start (step S805) after an image of the substrate has been captured by an image capture device. For example, process 800 may start after an image (e.g., a first image) is captured by image capture device 110 of printing device 100. In some implementations, process 800 may include accessing the first image (step S810) to perform an assessment of the first image. For example, printing device 100 may retrieve the image from image capture device 110 and/or from data stored in a storage device, such as machine-readable medium 160 and/or any other suitable storage device. In some implementations, the stored data may correspond to the data stored in step S580 of FIG. 5.

Process 800 may also include analyzing an image to determine if a number of voids are shown in the image (step S820). For example, printing device 100 may determine the amount of pixels in the image that have a particular tonal value of a set of tonal values, and compare a number representing the amount of pixels to a threshold value. In some implementations, the number exceeds the threshold value, printing device 100 may determine that the substrate is permeable. If the number does not exceed the threshold value, printing device 100 may determine that the substrate is not permeable. In some implementations, printing device 100 may store the data relating to the determination. Examples of steps that may be involved with analyzing the image to determine if a number of voids are shown are discussed in greater detail below with respect to, for example, FIG. 9.

Process 800 may also include determining whether an analysis of an additional image is needed to determine if the substrate is permeable (step S830). In certain aspects, the analysis of whether an additional image is needed to determine if the substrate is permeable may correspond to the analysis of whether an additional image is needed to determine whether the substrate is woven step S540 of FIG. 5). For example, printing device 100 may determine whether analysis of an additional image is needed to determine whether the substrate is permeable and/or confirm whether an initial determination that the substrate is permeable is accurate.

If an analysis of an additional image is needed (step S830; yes), process 800 may continue by accessing an additional image (step S840). For example, printing device 100 may retrieve the additional image from an image capture device, such as image capture device 110, and/or from data stored in a storage device, such as machine-readable medium 160 and/or any other suitable storage device. Process 800 may also include analyzing the additional image to determine if a number of voids are shown in the additional image (step S850). For example, like with step S820 printing device 100 may determine the amount of pixels in the additional image that have a particular tonal value of a set of tonal values, and compare a number representing the amount of pixels to a threshold value. The threshold value may be the same as or differ from the threshold value used in step S820. In some implementations, if the number of pixels exceeds the threshold, printing device 100 may determine that the substrate is permeable. Additionally, if the number of pixels do not exceed the threshold, printing device 100 may determine that the substrate is not permeable. In some implementations, printing device 100 may store the determination in a storage device. Like with step 820, examples of steps that may be involved with analyzing the additional image to determine if a number of voids are shown in the additional image are discussed in greater detail below with respect to, for example, FIG. 9. Process 800 may include determining whether analysis of other images are needed by returning to step S830.

If analysis of an additional image is not needed (step S830; no), process 600 may continue by storing data related to the determination of whether the substrate was permeable in a storage device (step S860). For example, printing device 100 may store, for a particular image, the image, the date and time of the capture of the image, the date and time of analysis of the image, the number of voids shown in the image, the tonal variations in the image, the number of pixels per tonal value in the image, a particular set of tonal values related to the image, a number of pixels in the particular set of tonal values in the image, a percentage of the total number of pixels that fall Within the particular set of tonal values in the image, a determination that the substrate is or is not permeable based on the analysis of the image or images, and/or any other data related to the analysis of the image. After the data is stored, process 800 may end (step S875).

Figure 9:
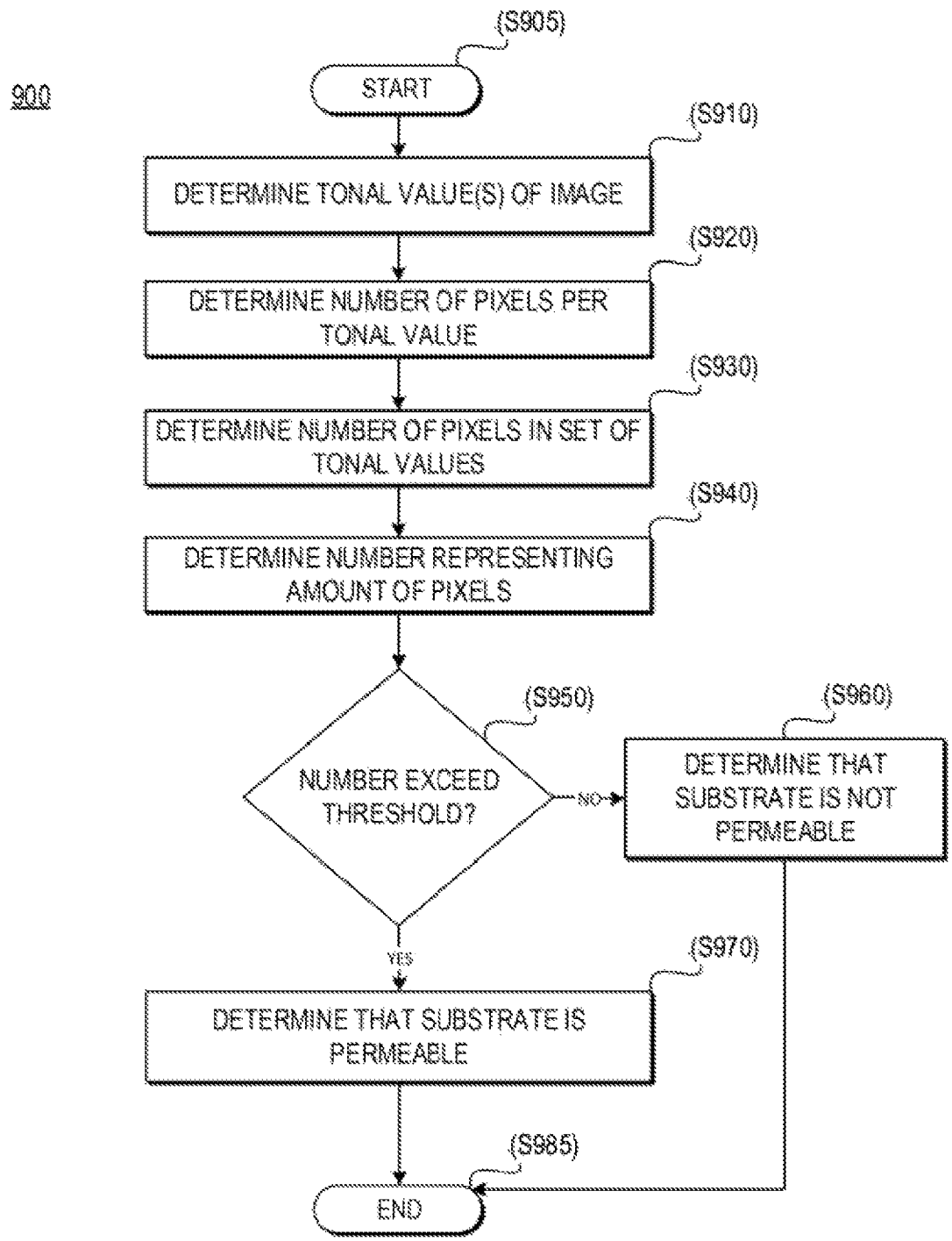
FIG. 9 is a flow chart of example process for determining if a number of voids are shown in an image of a substrate consistent with disclosed implemenations.

FIG. 9 is a flow chart of example process 900 for determining if a number of voids are present in an image of a substrate consistent with disclosed implementations. In certain aspects, process 900 may relate to the processes associated with step S420 of FIG. 4, step S820 of FIG. 8, and/or step S850 of FIG. 8. Although execution of process 900 is described below with reference to printing device 100 of FIG. 1 and/or specific components of printing device 100, other suitable systems and devices for execution of at least one step of process 900 may be used. For example, processes described below as being performed by printing device 100 may be performed by printing device 200, printing device 300 and/or any other suitable device. Process 900 may be implemented in the form of executable instructions stored on a storage device, such as a machine-readable storage medium, and/or in the form of electronic circuitry.

Process 900 may start (step S905) after an image of the substrate has been captured, in some implementations, process 900 may include determining the tonal values in the image (step S910). A tonal value may represent how light or how dark a pixel is. Generally, a pixel having a larger tonal value (e.g., a white pixel, with a tonal value of, for example, 256) may be brighter than a pixel having a smaller tonal value (e.g., a black pixel, with a tonal value of, for example, 0). In some implementations, printing device 100 may generate a histogram that may show the distribution of tonal values in the image. For example, the x-axis of the histogram may represent the tonal values in the image, and the y-axis of the histogram may represent the number of pixels within a particular tonal value.

Process 900 may include determining the number of pixels per tonal value (step S920). For example, printing device 100 may determine the tonal value for each pixel within the image, and sum up the number of pixels in each tonal value. In some implementations, printing device 100 may use the histogram to determine the number of pixels per tonal value. For example, printing device 100 may determine the y-axis value for a tonal values contained in the x-axis of the histogram.

Printing device 100 may also determine a number of pixels in a particular set of tonal values (step S930). For example, printing device 100 may store sets of tonal values in a storage device, such as machine-readable storage medium 160 and/or another storage device. The sets of tonal values may define tonal vales that, based an their value and/or respective position on the x axis of the histogram, may correspond to voids shown in an image. For example, the sets of tonal values may include tonal values that correspond to black and/or dark gray values that would be located towards the leftmost side of a histogram. An example of a suitable set of tonal values may include, for example, values between 0 and 70 (e.g., values indicating a dark pixel).

In some implementations, each set of tonal values may be associated with an illumination level. For example, a first set of tonal values at a first illumination level may differ from a second set of tonal values at a second illumination level. In some implementations, printing device 100 may access sets of tonal values stored in a machine-readable storage medium to identify an appropriate set of tonal values for the particular image being analyzed. For example, printing device 100 may perform a query based on the illumination level associated with the image to identify the appropriate set of tonal values. Once the appropriate set of tonal values has been determined, printing device 100 may determine the number of pixels in the image that have a tonal value corresponding to a tonal value in the identified set of tonal values. In some implementations, printing device 100 may use the histogram to determine the number of pixels in the image having a tonal value that corresponds with a tonal value in the identified set of tonal values. For example, printing device 100 may analyze the histogram to sum up all of the y-axis values for values along the x-axis that are within the identified set of tonal values.

Printing device 100 may also determine a number representing the amount of pixels corresponding to the identified set of tonal values (step S940). For example, in some implementations, printing device 100 may determine a percentage of pixels in the image corresponding to the identified set of tonal values. For example, printing device 100 may determine the total number of pixels in the image and divide the total number of pixels in the identified set of tonal values by the total number of pixels in the image. In some implementations, printing device 100 may use the histogram to determine the total number of pixels. For example, printing device 100 may determine the y-axis value for each tonal value represented on the x-axis of the histogram.

Process 900 may also include determining whether the number exceeds a threshold value (step S950). For example, printing device 100 and/or another device may set a threshold value that defines an acceptable percentage of pixels in a set of tonal values to determine that the substrate is woven. In some implementations, the threshold value may be based on the illumination level associated with the image. For example, printing device 100 may set a first threshold value based on a first illumination level and a second threshold value based on a second illumination level. In other implementations, the threshold value may be a single value that is set irrespective of the illumination level associated with the image. For example, the first threshold value may be set to be a predetermined number. The percentage of pixels in the set of tonal values, such as the percentage calculated in step S940, may be compared with the threshold value. In some implementations, if the percentage does not exceed the threshold value (step S950; no), then printing device 190 may determine that the substrate is not permeable (step S960). If the percentage exceeds the threshold value (step S950; yes) then printing device 100 may determine that the substrate is permeable (step 8970). Printing device lop may provide data regarding the determination of whether the substrate is permeable to a storage device such as a machine-readable medium, and/or another device for additional processing. Once a determination has been made regarding whether the substrate is permeable, process 900 may end (step S985).

Figure 10:
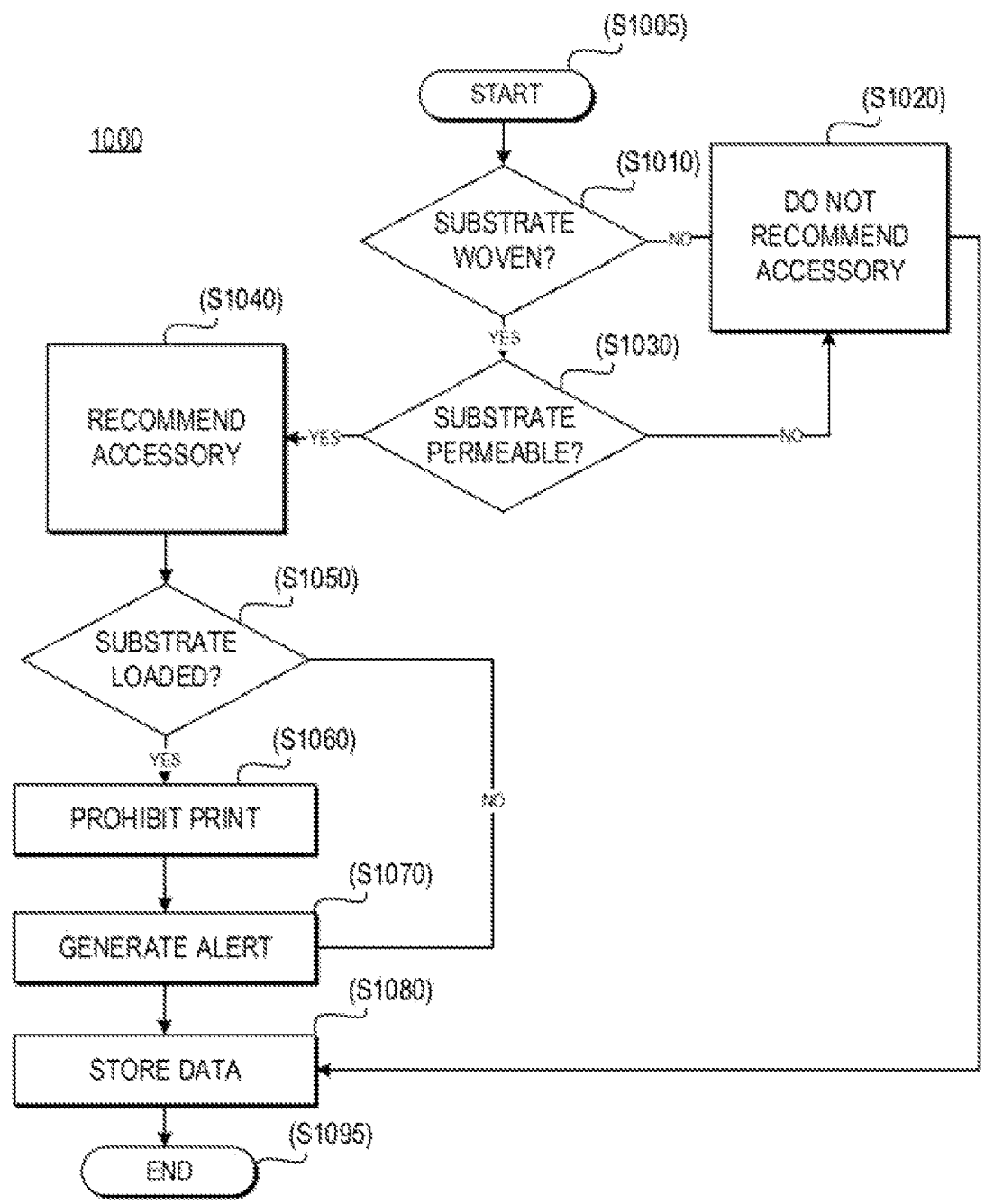
FIG. 10 is a flow chart of an example process for determining an accessory recommendation consistent with disclosed implementations.

FIG. 10 is a flow chart of an example process 1000 for determining an accessory recommendation consistent with disclosed implementations in certain aspects process 1000 may relate to the processes associated with step S430 of FIG. 4. Although execution of process 1000 is described below with reference to printing device 100 of FIG. 1 and/or specific components of printing device 100, other suitable systems and devices for execution of at least one step of process 1000 may be used. For example, processes described below as being performed by printing device 100 may be performed by printing device 200, printing device 300 and/or any other suitable device. Process 1000 may be implemented in the form of executable instructions stored on a storage device, such as a machine-readable storage medium, and/or in the form of electronic circuitry.

Process 1000 may start (step S1005) after a determination has been made that the substrate is woven and/or a determination has been made that a substrate is permeable. For example, if printing device 100 has determined that the substrate is not woven (step S1010; no), printing device 100 may not recommend that a printing accessory be used (step S1020). Similarly, if printing device 100 has determined that the substrate is not permeable (step S1030; no), printing device 100 may not recommend that a printing accessory be used. Accordingly, in some implementations, if printing device 100 does not recommend the use of an accessory, printing device 100 may print on the substrate without using a printing accessory. Process 1000 may continue by storing data related to the determination that a printing accessory was not needed in a storage device (step S1080) (discussed in more detail below).

If printing device 100 has determined that is substrate is woven (step S1010; yes) and that the substrate is permeable (step S1030; yes), process 1000 may include recommending that an accessory be used (step S1040), in some implementations, the accessory may be a printing fluid collector accessory, such as an ink collector accessory. Generally, an ink collector accessory may function to collect printing fluid that passes through a substrate. In some implementations, an ink collector accessory may extend under the substrate so that all or most of the printing fluid passing through the substrate is collected.

Process 1000 may also include determining whether the substrate is loaded in a printing device (step S1050) For example, in some implementations, a substrate may be automatically assessed when it is loaded into a printing device consistent with disclosed implementations. Thus, in some implementations, if the substrate is loaded into the printing device (step S1050; yes), printing device 100 may prohibit printing on the substrate (step S1060). For example, printing device 100 may prohibit a printing unit from applying printing fluid to the substrate.

If printing is prohibited (step S1060; yes), and/or if a substrate is not loaded into a printing device (step S1050; no), process 1000 may continue by generating an alert indicating that the substrate is permeable (step S1070). For example, printing device 1000 may generate and provide an alert to a display device, such as a display associated with I/O device 140, and/or any other suitable device. In certain aspects, printing device 100 may generate an alert to include data obtained, for example, from machine-readable medium 160 of printing device 100, another component of printing device 100 and/or another device. In some implementations, printing device 100 may generate the alert such that it includes information about the identity of the substrate (e.g., whether the substrate is woven), whether the substrate is permeable, whether an accessory is needed to print on the substrate, and/or the type of accessory to use when printing on the substrate.

Process 1000 may also include storing data related to the accessory commendation (step S1080). For example, print device 100 may provide data relating to the accessory recommendation to a storage device, such as a machine-readable medium, and/or another device for additional processing. Examples of data relating to the accessory recommendation may include: the determination of whether the substrate is woven; the determination of whether the substrate is permeable; the determination of whether to use a printing accessory; the type of printing accessory recommended; the date of the determination; the time of the determination; the alert; information related to the alert; information related to the user and/or device that initiated the substrate assessment; and/or any other data related to the accessory recommendation. After the determination of whether a printing accessory is needed has been completed, process 1000 may end (step S1095).

The disclosed examples may include systems, devices, computer-readable storage media, and methods for substrate permeability assessment. For purposes of explanation, certain examples are described with reference to the components illustrated in FIGS. 1-4. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are only used to distinguish one element from another.

Further, the sequence of operations described in connection with FIGS. 1-10 are examples and are not intended to be limiting. Additional or fewer operations or combinations of operations may be used or may vary without departing from the scope of the disclosed examples. For example, printing device 100 may receive an image captured by an image capture device external to printing device 100. As another example, the determination of whether a substrate is permeable and/or the determination of whether to recommend a printing accessory may be performed without identifying the substrate type. As another example, the determination of whether an additional image is needed to determine the substrate type and/or whether the substrate is permeable may be omitted. Thus, the present disclosure merely sets forth possible examples of implementations, and many variations and modifications may be made to the described examples. All such modifications and variations are intended to be included within the scope of this disclosure and protected by the following claims.

We claim:

1. A device for substrate permeability assessment comprising:
   an image capture device to capture an image of a substrate;
   a memory to store instructions; and
   a processor to execute the instructions to perform operations for substrate permeability assessment, the operations including:
   identifying a type of the substrate based on the image of the substrate on which no printing fluid has been applied;
   determining whether the substrate is fluid-permeable based on the image;
   determining an accessory recommendation based on the determination of the type of the substrate and the determination of whether the substrate is fluid-permeable; and
   preventing a printing unit from applying the printing fluid to the substrate if the substrate is determined to be fluid-permeable and loaded into a printing device.

2. The device of claim 1, wherein identifying the type of the substrate based on the image comprises analyzing the image to determine whether the image includes a repeating pattern.

3. The device of claim 2, wherein analyzing the image comprises:
   applying a Fast Fourier Transform to the image; and
   analyzing the Fast Fourier Transform to determine if an amplitude of the Fast Fourier Transform exceeds a threshold value;
   determining that the substrate is woven if the amplitude exceeds the threshold value; and
   determining that the substrate is not woven if the amplitude does not exceed the threshold value.

4. The device of claim 1, wherein:
   the image is a first image; and
   identifying the type of the substrate based on the first image comprises:
   capturing a second image of the substrate; and
   determining if the substrate is transparent based on a comparison between the first image and the second image.

5. The device of claim 1, wherein determining whether the substrate is fluid-permeable based on the image comprises determining whether the image shows a number of voids in the substrate.

6. The device of claim 5, wherein determining whether the image shows a number of voids in the substrate comprises:
   determining tonal values of the image;
   determining a number representing an amount of pixels of the image in a set of tonal values; and
   determining whether the substrate is fluid-permeable based on whether the number exceeds a threshold value.

7. The device of claim 1, wherein:
   the image is a first image;
   the image capture device captures a second image of the substrate, the second image being different from the first image; and
   the operations include:
   determining whether the substrate is woven based on the second image;
   determining whether the substrate is fluid-permeable based on the second image; and
   determining the accessory recommendation based on the determination of whether the substrate is woven based on the second image and the determination of whether the substrate is fluid-permeable based on the second image.

8. The device of claim 7, wherein:
the first image is captured at a first illumination level; and the second image is captured at a second illumination level that differs from the first illumination level.

9. The device of claim 1, wherein the operations include: generating an alert if the substrate is determined to be woven and fluid-permeable.

10. A non-transitory computer-readable storage medium including instructions that, when executed on a processor, cause the processor to:
    determine whether voids are shown in an image of a substrate;
    determine whether there is a repeating pattern in the image;
    determine whether printing fluid would pass through the substrate during printing based on the determination of whether voids are shown in the image and the determination of whether there is a repeating pattern in the image; and
    prevent printing on the substrate without an accessory if it is determined that the printing fluid would pass through the substrate during printing.

11. The non-transitory computer-readable storage medium of claim 10, wherein the repeating pattern corresponds to a weave pattern of a woven substrate.

12. The non-transitory computer-readable storage medium of claim 10, the instructions, when executed by the processor, cause the processor to:
    generate an alert if it is determined that the printing fluid would pass through the substrate during printing.

13. The non-transitory computer-readable storage medium of claim 10, wherein the image is of the substrate on which no printing fluid has been applied.

14. A computer-implemented method for substrate permeability assessment comprising:
    determining, via the processor, whether a repeating pattern is present in an image of a substrate on which no printing fluid has been applied;
    identifying, via the processor, the substrate as a woven substrate if the repeating pattern is present in the image or as a non-woven substrate if the repeating pattern is not present in the image;
    determining, via the processor, whether voids are shown in the image; and
    identifying, via the processor, the substrate as a fluid-permeable substrate if voids are shown in the image or as non-fluid-permeable if voids are not shown in the image; and
    preventing a printing unit from applying printing fluid to the substrate if the substrate is determined to be fluid-permeable.

15. The method of claim 14, comprising:
    identifying, via the processor, the substrate as a transparent substrate based on an analysis of the image and a second image of the substrate,
    wherein an image capture condition related to the second image differs from at an image capture condition related to the first image.

* * * * *